United States Patent [19]

Misra

[11] Patent Number: 4,822,592
[45] Date of Patent: Apr. 18, 1989

[54] PRODUCING ALPHA ALUMINA PARTICLES WITH PRESSURIZED ACIDIC STEAM

[75] Inventor: Chanakya Misra, Plum Borough, Pa.

[73] Assignee: Aluminum Company of America, Pittsburgh, Pa.

[21] Appl. No.: 153,419

[22] Filed: Feb. 8, 1988

Related U.S. Application Data

[63] Continuation-in-part of Ser. No. 11,247, Feb. 5, 1987, abandoned.

[51] Int. Cl.$^4$ .............................................. C01F 7/02
[52] U.S. Cl. .................................... 423/627; 423/624; 423/625; 423/626; 423/628; 423/111; 501/153
[58] Field of Search .............. 423/624, 625, 627, 626, 423/628, 111; 501/153

[56] References Cited

U.S. PATENT DOCUMENTS 2,642,337  6/1953  Newsome .......................... 23/142
4,019,914  4/1977  Esper et al. ........................ 106/62
4,477,427  10/1984  Matyasi et al. ................... 423/628

FOREIGN PATENT DOCUMENTS 802731  10/1958  United Kingdom ............. 423/628

OTHER PUBLICATIONS

The Condensed Chemical Dictionary, Eigth Ed. Van Nostrand Reinhold Company NY p. 246, 1971.

Primary Examiner—Robert L. Stoll
Assistant Examiner—Paige C. Harvey
Attorney, Agent, or Firm—Glenn E. Klepac

[57] ABSTRACT

Alumina particles having average particle size of about 1–20 microns are converted to alpha alumina in a steam-fluidized bed maintained at about 380°–600° C. and a pressure greater than about 1000 psig. Acidifying the steam reduces average crystallite size of the product and lowers content of some impurities. A preferred product is alpha alumina having an average crystallite size of less than about 0.2 micron.

18 Claims, 2 Drawing Sheets

PRODUCING ALPHA ALUMINA PARTICLES WITH PRESSURIZED ACIDIC STEAM

PENDING RELATED PATENT APPLICATION

This application is a continuation of U.S. Ser. No. 011,247 filed Feb. 5, 1987, now abandoned.

FIELD OF THE INVENTION

The present invention relates to a process for making alpha alumina particles. The product is used extensively in industry as a ceramic material.

BACKGROUND OF THE INVENTION

Processes for making alpha alumina are known in the prior art. Alpha alumina is usually prepared by calcining aluminum hydroxides, aluminum sulfate, ammonium alum or organic compounds of aluminum at temperatures above 1200° C. The temperature and time of calcination are selected to obtain complete conversion to alpha alumina and elimination of so-called "transition" alumina forms. The calcined material is then milled to fine particle size. Sintered articles of alumina are made by pressing or slip casting the ground powder to required shape and then firing the "green" shape to temperatures of about 1400°–1800° C. to obtain the final product, a dense sintered ceramic article.

Properties of the final product are influenced by two important characteristics of the alpha alumina. These characteristics are (a) size of "ultimate crystallites" of the alpha alumina and (b) chemical purity of the alpha alumina. As used herein, the term "crystallite" refers to that portion of an alpha alumina crystal whose molecules form a perfect lattice without strains or other imperfections. Both density and mechanical strength of the ceramic product after sintering are increased by reducing the crystallite size and by increasing chemical purity of the alpha alumina.

Processes for producing alpha alumina are known in the prior art. However, each of the prior art processes suffers from one or more serious disadvantages making it less than entirely suitable for its intended purpose.

The present invention represents an improvement over the method disclosed in Newsome U.S. Pat. No. 2,642,337 issued June 16, 1953. Newsome's method comprises heating alumina hydrate in contact with steam at a pressure of about 350–2500 pounds per square inch and a temperature of about 400°–550° C., thereby converting the hydrate to alpha alumina. It is preferable to agitate particles of the alumina during the process in order to secure uniform heating and contact between the particles and steam.

The invention claimed and described herein improves upon Newsome's method by heating alumina particles under pressure in a bed fluidized by acidic steam, thereby significantly reducing average crystallite size and average particle size of the alpha alumina product.

Esper et al U.S. Pat. No. 4,019,914 discloses a process for manufacturing alpha alumina said to have excellent sintering activity. The process requires first finely grinding a mixture of alumina and a "calcination auxiliary agent" which may be $Fe_2O_3$ or $Cr_2O_3$. The mixture is calcined at 1120°–1350° C., cooled, and then further ground to produce particles having a "grain size" of not more than 0.2 micron.

Matyasi et al U.S. Pat. No. 4,477,427 claims a process of forming alkali-poor alpha alumina. The process requires activating aluminum hydroxide at 500°–600° C., washing the activated alumina with an alkali-free solution containing calcium ions, and then calcining at about 1200°–1350° C. in the presence of a mineralizing mixture comprising halides and boron compounds. The latter mixture preferably contains boric acid and aluminum fluoride and may also contain calcium fluoride.

British Patent No. 802,731 discloses a process for producing alpha alumina having low sodium content. Alumina powder is heated to a temperature of about 1300°–1700° C. until a substantial part of the sodium content is vaporized. The powder is then cooled, and finally washed with hot hydrochloric acid and hot water until sodium oxide content is further reduced. Grain size of the powder is said to be 1–10 microns. The patent fails to suggest treating alumina powder with an aqueous acid solution or with steam having the pH and temperature conditions claimed herein.

None of the prior art references cited above discloses or suggests treating alumina powder with acidified steam at a temperature of 380° C. or higher.

It is a principal objective of the present invention to provide a process for producing alpha alumina having very small ultimate crystallite size.

Other objects and advantages of the present invention will become apparent to persons skilled in the art from the following specification and claims.

SUMMARY OF THE INVENTION

In accordance with the present invention, alumina particles are sized to an average particle size of about 1–20 microns, preferably about 1–10 microns. The alumina particles are preferably alumina hydrate particles having an average particle size of about 7.5 microns. Initial alpha alumina content of the alumina hydrate particles is generally less than about 25 wt %, more usually less than about 1 wt %.

As used herein, the term "alumina hydrate" refers to $Al_2O_3 \cdot xH_2O$, wherein x varies from about 0.2 to 3; in other words, the water of the alumina hydrate varies between about 3 and 35 percent by weight of the alumina hydrate, determined by calcination at 1200° C. for one hour. Alumina hydrate that is suitable for use herein can be obtained from a variety of sources, most commonly as the product of the well-known "Bayer" process.

The alumina hydrate particles are fluidized in a reactor by means of a fluidizing gas comprising principally steam. The fluidizing gas preferably comprises at least about 95 volume percent steam and is optimally substantially all (greater than about 99 volume percent) steam.

The particles are maintained in the reactor at a temperature of about 380°–600° C. and a pressure of at least about 1000 psig for a sufficient time to obtain particles comprising predominantly alpha alumina and having reduced sodium oxide content. Temperatures of about 425°–550° C. and pressures of about 1000–6000 psig are preferred. A reaction temperature of about 425°–500° C. is particularly preferred. Total reaction time is generally about 4–100 hours. Reaction time is reduced by increasing the temperature because higher temperatures enhance the rate of conversion to alpha alumina.

The pH of the fluidizing gas is preferably controlled to a value of about 3–6 and more preferably about 3–5. A pH of about 4 has been found particularly suitable. The pH is preferably at least 3 because lower pH steam (e.g. pH 1–2) is highly corrosive at elevated temperatures.

The fluidizing gas pH is controlled by boiling water to which a water-soluble acid has been added. Some suitable acids are hydrochloric acid, hydrofluoric acid, acetic acid, nitric acid, sulfuric acid, and carbonic acid. Nitric acid is particularly preferred.

The resulting particles are predominately alpha alumina, generally greater than about 99 wt % pure and optimally greater than 99.9 wt % alpha alumina. The alpha alumina particles have an average crystallite size of less than about 1 micron, preferably less than about 0.5 micron and usually less than about 0.2 micron. A particularly preferred embodiment has produced particles having average crystallite size of about 0.1 micron.

DETAILED DESCRIPTION OF A PREFERRED EMBODIMENT

Figure 1:
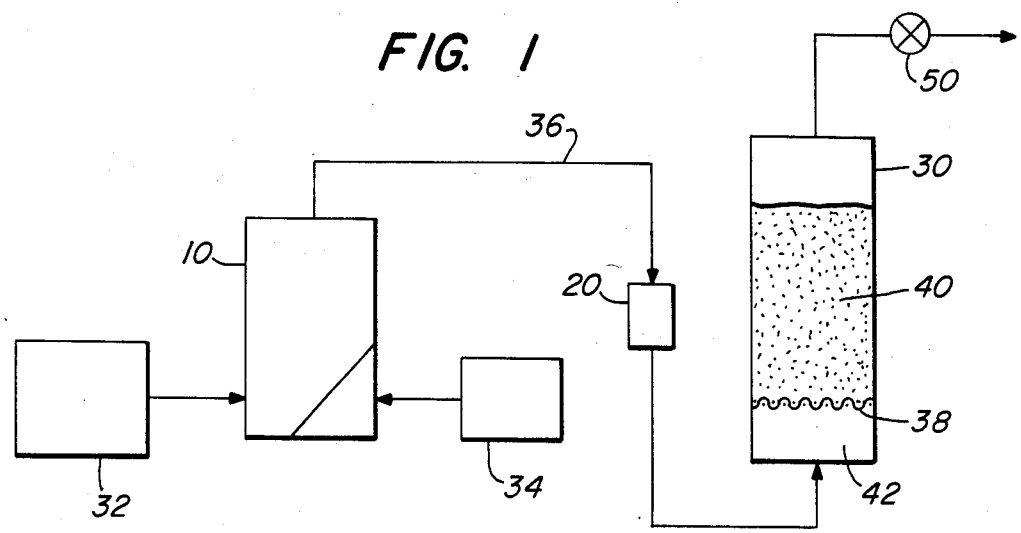
FIG. 1 is a schematic illustration of an apparatus suitable for performing the process of the present invention.

A preferred apparatus for carrying out the process of the present invention is shown schematically in FIG. 1. The principal components are a boiler 10 for generating supercritical steam, a flow meter 20 for metering flow of the supercritical steam, and a fluidized bed reactor 30 for converting alumina particles to alpha alumina.

A water source 32 feeds water to the boiler 10. The feed water is preferably acidified with $HNO_3$ so that its pH is about 4. A heat source 34 heats water in the boiler 10, generating steam. The heat source 34 may utilize natural gas, oil, electricity, coal, or other heating means, with natural gas being particularly preferred. A pipe 36 carries steam from the boiler 10 to the reactor 30 through a flow meter 20. The flow meter 20 is adjusted to maintain a pressure above about 1000 psig in the boiler 10. Pressures of about 1000-6000 psig are preferred.

The reactor 30 contains a grid 38 supporting a bed of alumina particles 40 above a steam chamber 42. A control valve 50 maintains steam pressure in the reactor 30 at about 1000-6000 psig. The particles 40 are fluidized with the steam for a sufficient time to obtain a product comprising principally alpha alumina. A preferred reactor temperature is about 450° C. At that temperature, substantially complete conversion to alpha alumina is accomplished within about 5-12 hours.

Figure 2:
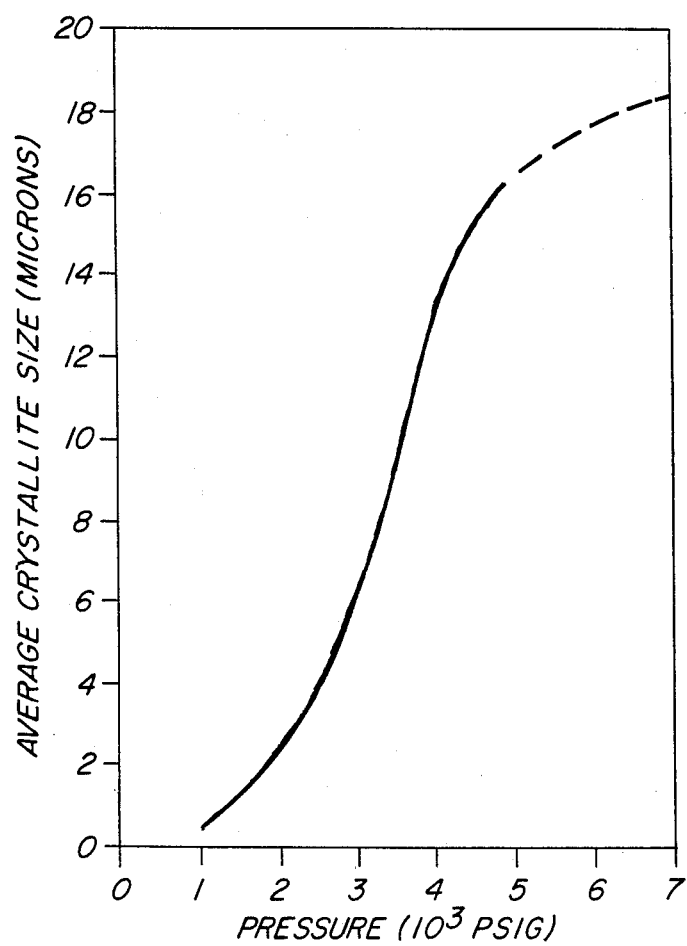
FIG. 2 is a graph showing average crystallite size of alpha alumina as a function of process pressure.

FIG. 2 is a graph showing average crystallite size of the alpha alumina product as a function of reactor pressure. The data in FIG. 2 were obtained by treating alumina particles having average size of about 7.5 microns with steam at pH 7 for about 8-12 hours at 480° C. FIG. 2 shows that average crystallite size of the product can be controlled by varying steam pressure in the reactor 30.

Figure 3:
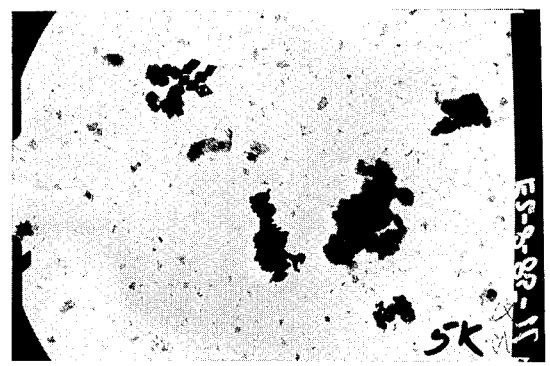
FIG. 3 is a transmission electron microphotograph of alpha alumina particles made by the process of the invention.

When pH of the steam is reduced to about 4 by addition of $HNO_3$ to the feed water 32, average crystallite size of the product is reduced to less than about 0.2 micron when the reactor is operated at 480° C. and about 1000-6000 psig. A 5000× transmission electron microphotograph of the low pH steam-treated product is shown in FIG. 3. The particles shown in FIG. 3 were obtained by treating alumina with acidic steam having a pH of 4 at 450° C. and 2000 psig for about 6 hours. The larger particles are readily broken into smaller particles by gentle agitation. Average crystallite size is only about 0.1 micron. An important feature of this product is that alpha alumina particles having such small crystallite size can be sintered into ceramic shapes at lower sintering temperatures than articles made with alpha alumina particles having larger crystallites.

Another advantage of the process of the invention is that content of sodium oxide and other impurities in the product is greatly reduced. The following Tables show impurity content in two samples of the alumina before processing and after treatment with acidified steam and neutral steam.

TABLE I

| | Impurity Content (wt %) | | |
|---|---|---|---|
| Impurity | Alumina Before Treatment | Alpha Alumina (Acid + Steam) | Alpha Alumina (Neutral Steam) |
| $SiO_2$ | 0.031 | 0.031 | 0.032 |
| $Fe_2O_3$ | 0.050 | 0.044 | 0.045 |
| $TiO_2$ | 0.002 | 0.002 | 0.002 |
| $Na_2O$ | 0.32 | 0.17 | 0.18 |
| CaO | 0.031 | 0.031 | 0.032 |
| MgO | 0.000 | 0.000 | 0.000 |
| ZnO | 0.002 | 0.002 | 0.002 |
| CuO | 0.001 | 0.000 | 0.000 |
| $Ga_2O_3$ | 0.016 | 0.015 | 0.016 |
| $V_2O_5$ | 0.000 | 0.000 | 0.000 |
| NiO | 0.003 | 0.002 | 0.002 |
| MnO | 0.000 | 0.000 | 0.000 |
| $Cr_2O_3$ | 0.002 | 0.001 | 0.001 |
| $B_2O_3$ | 0.000 | 0.000 | 0.000 |
| $ZrO_2$ | 0.004 | 0.003 | 0.004 |
| $Li_2O$ | 0.020 | 0.019 | 0.020 |

TABLE II

| | Impurity Content (wt %) | | |
|---|---|---|---|
| Impurity | Alumina Before Treatment | Alpha Alumina (Acid + Steam) | Alpha Alumina (Neutral Steam) |
| $SiO_2$ | 0.026 | 0.021 | 0.026 |
| $Fe_2O_3$ | 0.019 | 0.017 | 0.020 |
| $TiO_2$ | 0.005 | 0.005 | 0.005 |
| $Na_2O$ | 0.39 | 0.075 | 0.088 |
| CaO | 0.047 | 0.035 | 0.048 |
| MgO | 0.001 | 0.000 | 0.001 |
| ZnO | 0.000 | 0.000 | 0.000 |
| CuO | 0.000 | 0.000 | 0.000 |
| $Ga_2O_3$ | 0.012 | 0.011 | 0.011 |
| $V_2O_5$ | 0.000 | 0.000 | 0.000 |
| NiO | 0.001 | 0.001 | 0.001 |
| MnO | 0.000 | 0.000 | 0.000 |
| $Cr_2O_3$ | 0.000 | 0.000 | 0.000 |
| $B_2O_3$ | 0.000 | 0.000 | 0.000 |
| $ZrO_2$ | 0.002 | 0.001 | 0.002 |
| $Li_2O$ | 0.000 | 0.000 | 0.000 |

Figure 4:
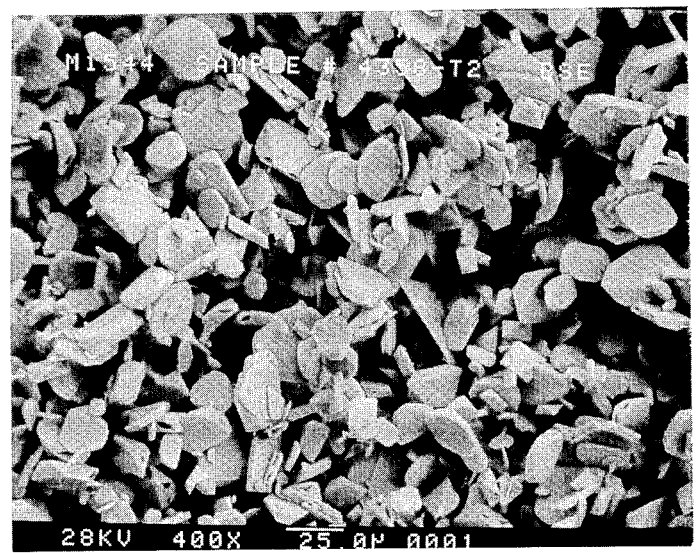
FIG. 4 is a scanning electron microphotograph of alpha alumina particles made by a process different from the process used to obtain the particles shown in FIG. 3.

FIG. 4 is a 400× scanning electron microphotograph of alpha alumina made by treating alumina with steam at 450° C. and about 6000 psig for 8 hours. No acid was added to the steam. Average particle size is approximately 20 microns.

The foregoing detailed description of my invention has been made with reference to several preferred examples. The following claims are intended to cover all embodiments falling within the spirit and scope of the invention.

What is claimed is:

1. A process for producing alpha alumina particles having crystallite size below about 1 micron, said process comprising:
   (a) providing particles of alumina having less than about 25 wt % alpha alumina content and an average particle size of about 1-20 microns,
   (b) fluidizing the alumina particles in a reactor with a fluidizing gas comprising principally steam having a pH of about 3-6, and
   (c) maintaining the alumina particles in said reactor at a temperature of about 380°-600° C. and a steam pressure of at least about 1000 psig for a sufficient time to obtain particles comprising predominantly alpha alumina and having an average crystallite size of less than about 1 micron.

2. The process of claim 1 wherein the pH of the fluidizing gas is about 3-5.

3. The process of claim 1 wherein the average crystallite size of the alpha alumina is less than about 0.5 micron.

4. The process of claim 1 wherein the average crystallite size of the alpha alumina is less than about 0.2 micron.

5. The process of claim 1 wherein the alumina particles provided in step (a) comprise alumina hydrate particles having average particle size of about 1-10 microns.

6. The process of claim 1 further comprising:
   (d) boiling water to obtain steam for the fluidizing gas in step (b), and
   (e) adding a water-soluble acid to the water.

7. The process of claim 6 wherein said acid is selected from the group consisting of hydrochloric acid, hydrofluoric acid, acetic acid, nitric acid, sulfuric acid, and carbonic acid.

8. The process of claim 6 wherein said acid is nitric acid.

9. The process of claim 1 wherein the temperature in the reactor is about 425°-550° C.

10. The process of claim 1 wherein the temperature in the reactor is about 425°-500° C.

11. The process of claim 1 wherein step (c) is performed for approximately 4-100 hours.

12. The process of claim 1 wherein the reactor pressure is about 1000-6000 psig.

13. In a process for producing alpha alumina particles of average crystallite size of less than about 1 micron, said process comprising the steps of:
   (a) sizing particles of alumina having less than about 25 wt % alpha alumina content to obtain an average particle size of about 1-2 microns,
   (b) fluidizing the sized alumina particles in a fluidized bed reactor with a fluidizing gas comprising principally steam, and
   (c) maintaining the sized alumina particles in said reactor at a temperature of about 380°-500° C. and a steam pressure of about 1000-6000 psig for a sufficient time to obtain particles comprising predominantly alpha alumina;
the improvement comprising controlling the pH of the fluidizing gas to a value of about 3-6.

14. The process of claim 13 wherein the pH of the fluidizing gas is about 3-5.

15. The process of claim 13 further comprising:
   (d) boiling water to obtain steam for the fluidizing gas in step (b), and
   (e) adding to the water of step (d) a water-soluble acid selected from the group consisting of nitric acid, hydrochloric acid, hydrofluoric acid, acetic acid, sulfuric acid, and carbonic acid.

16. The process of claim 13 wherein the average crystallite size of the alpha alumina is less than about 0.5 micron.

17. The process of claim 13 wherein the average crystallite size of the alpha alumina is less than about 0.2 micron.

18. The process of claim 13 wherein the average crystallite size of the alpha alumina is about 0.1 micron.

* * * * *

UNITED STATES PATENT AND TRADEMARK OFFICE
CERTIFICATE OF CORRECTION

PATENT NO. : 4,822,592
DATED : April 18, 1989
INVENTOR(S) : Chanakya Misra

It is certified that error appears in the above-identified patent and that said Letters Patent is hereby corrected as shown below:

Other Publications:     Change "Eigth" to --Eighth--.

Col. 2, line 39     Change "$Al_2O_3.xH_2O$" to --$Al_2O_3 \cdot xH_2O$--.

Claim 13,
Col. 6, line 12     Change "1-2" to --1-20--.

Signed and Sealed this

Second Day of January, 1990

Attest:

JEFFREY M. SAMUELS

*Attesting Officer*     *Acting Commissioner of Patents and Trademarks*